US006985649B2

(12) United States Patent
Fukashiro et al.

(10) Patent No.: US 6,985,649 B2
(45) Date of Patent: Jan. 10, 2006

(54) OPTICAL SWITCHING APPARATUS AND OPTICAL SWITCHING METHOD

(75) Inventors: Yasuyuki Fukashiro, Yokohama (JP); Tooru Hirai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 494 days.

(21) Appl. No.: 09/966,052

(22) Filed: Sep. 28, 2001

(65) Prior Publication Data

US 2002/0191892 A1 Dec. 19, 2002

Related U.S. Application Data

(63) Continuation of application No. 09/946,577, filed on Sep. 5, 2001, now Pat. No. 6,714,697.

(30) Foreign Application Priority Data

Jun. 19, 2001 (JP) ........................................ 2001-184230

(51) Int. Cl.
*G02B 6/26* (2006.01)
*H04B 10/00* (2006.01)

(52) U.S. Cl. .............................. 385/16; 385/15; 385/17; 385/24; 398/111; 398/112; 398/113; 398/43; 398/48

(58) Field of Classification Search ................... 385/15, 385/16, 17, 24; 398/111, 113, 112, 43, 48
See application file for complete search history.

(56) References Cited

U.S. PATENT DOCUMENTS

| | | | | | |
|---|---|---|---|---|---|
| 4,313,224 | A | * | 1/1982 | Wakabayashi et al. | ....... 359/177 |
| 5,054,876 | A | * | 10/1991 | Grasso et al. | .................. 385/24 |
| 5,757,526 | A | * | 5/1998 | Shiragaki et al. | ........... 359/110 |
| 5,940,209 | A | * | 8/1999 | Nguyen | .................... 359/341.1 |
| 6,055,078 | A | * | 4/2000 | Chen et al. | .................. 359/130 |
| 6,115,154 | A | * | 9/2000 | Antoniades et al. | ........ 359/110 |
| 6,407,854 | B1 | * | 6/2002 | Shum | ..................... 359/341.41 |
| 6,714,697 | B2 | * | 3/2004 | Fukashiro et al. | ............ 385/16 |
| 2002/0191892 | A1 | * | 12/2002 | Fukashiro et al. | ............ 385/16 |

FOREIGN PATENT DOCUMENTS

| | | | |
|---|---|---|---|
| JP | 06-051355 | 2/1994 | ............... 385/16 X |
| JP | 11-32010 | 2/1999 | ............... 385/16 X |

OTHER PUBLICATIONS

Shinji Nagaoka; 1997; Multi–port 1×2 Single–mode Fiber Switch; NTT Opto–ekectronics Laboratories; B–10–189; pp. 488.

I. Nakajima, I. Tsuyama, and S. Kuroyanagi; 1999; A Frequency Multiplexded Routing and Selecting Hybrid Switch; Fujitsu Laboratories Ltd., Fujitsu Digital Technology Ltd.; B–12–17; pp. 356.

K. Otsuka, T. Maki, Y. Sanpei, Y. Tachikawa, N. Fukushima, and T. Chikama; 1997; Power Control in ADM Node using High–speed, Compact–size Optical Spectrum Monitor; Fujitsu Laboratories Ltd., Fujitsu Limited, Yokogawa Electric Corporation; B–10–101; p. 400.

M. Makihara, F. Shimokawa, and K. Kaneko; 2000; Strictly Non–blocking N×N Thermo–Capillarity Optical Matrix Switch using Silica–based Waveguide; NTT telecommunication Energy Laboratories; pp. TuM2–1/207–TuM2–3/209.

E. L. Goldstein and L. Y. Lin; 1998; Multiwavelength Opaque Optical–Crossconnect Networks; AT&T Labs–Research; Third Optoelectronics and Communications Conference; Technical Digest; pp. 400–401.

J. E. Fouquet; 2000; Compact Optical Cross–Connect Switch Based on Total Internal Reflection in a Fluid–Containing Planar Lightwave Circuit; Agilent Laboratories; pp. 204/TuM1–1—206/TuM1–3.

* cited by examiner

*Primary Examiner*—Brian M. Healy
(74) *Attorney, Agent, or Firm*—Knoble Yoshida & Dunleavy

(57) ABSTRACT

An optical switching apparatus includes an optical switch having a plurality of input ports and output ports, optical amplifiers, monitor circuits, optical amplifiers monitor circuits, and a controller that controls the optical switch. The optical amplifiers are connected to the input ports of the optical switch. The monitor circuits are connected to the output ports of the optical switch. The controller selects one of the plurality of the monitor circuits based on predetermined rules to obtains the loss at the output ports and/or the differential loss between the channels of the optical switch.

The controller further selects one of the optical amplifiers based on the configuration of the optical switch to compensate the loss and the differential loss among the different channels of the optical switch by pre-amplifying the optical signals before they reach the input ports of the optical switch.

14 Claims, 6 Drawing Sheets

OPTICAL SWITCHING APPARATUS AND OPTICAL SWITCHING METHOD

This application is a Continuation Application of a application Ser. No. 09/946,577, now U.S. Pat. No. 6,714,697, as filed on Sep. 5, 2001 under 35 C.F.R. 1.53(b).

BACKGROUND OF THE INVENTION

1. Field of the Invention

The present invention relates to an optical communication device and methods of using this device. In particular, the present invention relates to an optical switching apparatus suitable for switching and outputting optical signals received from a plurality of optical transmission lines to other optical transmission lines, and methods for using this apparatus.

2. Prior Art of the Invention

To handle the sudden increase in data traffic through the Internet, etc. and the quickly growing demands for multimedia communication of images, sound and data, much progress has been made to increase the speed and the capacity of the transmission lines and telecommunication network nodes. To achieve a higher transmission speed, optical communication devices and optical fiber transmission lines are generally used to transmit signals between telecommunication network nodes.

In recent years, to handle the ever increasing speed of communication networks and to improve the capacity of communication devices, these communication networks and devices use optical switching apparatuses such as optical cross-connects (hereafter, referred to as OXC) and optical add-drop multiplexing apparatuses (hereafter, referred to as OADM), which implement switching processes such as switching of transmission lines and switching of circuits without converting optical signals to electric signals before processing the signals as in the conventional communication devices.

The OXC or OADM typically includes optical switches as its main components. At present, since a single stage high-capacity optical switch is not commercially available, a high-capacity optical switch is usually implemented through a multi-stage combination of the commercially available low-capacity optical switches such as 2×2 or 8×8 switches. The optical signal power loss and differential loss among the channels of a commercial low-capacity optical switch might reach from several dB to more than ten dB. These losses between the channels might be even larger for a high-capacity switch including a multi-stage combination of the commercially available low-capacity optical switches. Typically, an optical communication system includes optical transmitters and optical receivers before and after optical switches. Since these optical transmitters and receivers have limited optical transmission output powers, sensitivities and dynamic ranges, compensation is generally required for the optical switch loss and differential loss between the channels.

Several methods have been proposed to solve this problem. In "A Frequency Multiplexed Routing and Selecting Hybrid Switch," Denshi Joho Tsushin Gakkai [Electronic Information and Communication Association]/Tsushin Society Taikai [Communication Society Conference (1999)]/B-12-17 (Reference A), a method is disclosed to compensate for the losses by placing optical amplifiers in the middle and/or at the output of the multi-stage optical switches. In "Power Control in ADM Node Using High-speed Compact-size Optical Spectrum Monitor," Denshi Joho Tsushin Gakkai [Electronic Information and Communication Association]/Tsushin Society Taikai [Communication Society Conference (1997)]/B-10-101 (Reference B), it is disclosed that a wavelength-division-multiplexed (WDM) optical signal is first wavelength-demultiplexed by an OADM into an optical signal with multiple wavelengths, and that after controlling the optical amplitude for each of the wavelengths using variable optical attenuators, the signals are again wavelength-division-multiplexed. In this method, the amplitude for each wavelength is controlled based on the results of multiplex signal spectrum monitors after wavelength-division-multiplexing.

Kokai Patent Journal No. HEI 11 [1999]-32010 (Reference C) to the inventor of the present application discloses an OXC containing several optical switches and a few optical amplifiers between the optical switches, wherein the optical signal amplitude is controlled using a configuration wherein the amplification of optical signals is adjusted with the optical amplifiers, which is in turn controlled by the amplitude of the output optical signals.

At present, a high-capacity optical switch is usually realized by combining commercially available low-capacity optical switches in multi-stages. Therefore, it is necessary to appropriately calibrate and install an optical transmission line from the output port of an optical switch at one stage to the input port of another optical switch at the next stage. Thus, maintenance is often required for those transmission lines between the stages, and the optical transmission is interrupted during the maintenance. Further, the interruption may also occur when the high-capacity optical switch is under the normal operation.

A high-capacity switching apparatus, in which optical amplifiers are placed inside or after optical switches, such as the ones disclosed in References A and C, often causes sensitivity degradation of the optical parts on the reception side due to light surges caused by the above described interruption of light. Thus, the configuration disclosed in Reference A or C requires a surge-preventing function in the switching controlling unit of the optical switches and/or the controlling unit of the optical amplifiers. Otherwise, the disclosed high capacity switching apparatus needs to use high performance optical parts such as ones with a wide dynamic range. In addition, to compensate for the optical signals which suffer the power loss in the optical switches, the high-capacity switching apparatus includes optical amplifiers placed after the optical switches. Since the spontaneous emission noise of the optical amplifiers is added to the optical signals with a lowered power, the signal-to-noise ratio of the optical signal may decrease and cause errors in the receiver.

Furthermore, the optical signal received by the input port of an optical switch may take various inner paths before reaching the output port, and the optical switch in each stage is appropriately selected and configured. That is, because the characteristics such as the amplitude loss or the differential loss between the channels of each of the switches in the multi-stage combination is different, the loss between the channels of the optical switches between the input port and the output port will significantly vary depending on the actual configuration of optical switches in the multi-stage combination. Therefore, to offer a high performance large-capacity optical switch, it is desirable to realize compensation for the optical switch loss and the differential loss between channels that have occurred in the chosen optical path for each input/output port. The optical switching apparatuses as disclosed in Reference A or C, however, do not offer the above desired function.

Meanwhile, the OADM as disclosed in Reference B adopts a configuration wherein the spectra of wavelengthdivision-multiplexed optical signals are monitored and the loss is compensated for each demultiplexed wavelength in the OADM. In this configuration, since the wavelength of each signal to be compensated must be different from one another, the wavelengths and the multiplexing methods of the optical signals used as optical switching apparatuses will be limited. In addition, it is still not compatible with either an optical switch with a flexible configuration wherein the wavelengths monitored by the monitor units correspond to the wavelengths processed by the loss compensation units in a one-to-one fashion. It is desired various connections should be adopted with switching. Alternatively, an optical switch should have a flexible configuration with no restrictions in the wavelength of the optical signals in the multiplexing methods.

SUMMARY OF THE INVENTION

It is an objective of certain embodiments of the present invention to provide an optical switching apparatus with improved compensation functions for loss and loss differential between the channels in the optical switching apparatus, and a method of using this apparatus.

It is another objective of certain embodiments of the present invention to provide an optical switching apparatus, wherein the loss and the differential loss between the channels is easily compensated even when a high-capacity optical switch is involved, and a method of using this apparatus.

It is yet another objective of certain embodiments of the present invention to provide a high speed and high capacity optical switching apparatus with a simple configuration and installation procedure, or by including simple hardware and software (or firmware) and a method of using this apparatus. This apparatus has few limitations to the wavelengths of the optical signals or the multiplexing methods, and easily and securely compensates for the loss and differential loss between channels of the optical signals even while the apparatus is in service.

It is still yet another objective of certain embodiments of the present invention to provide an optical switching apparatus and a method of using this apparatus without using special high function parts or control technologies with a simple configuration and installation procedure or by means of simple hardware and software (or firmware). This apparatus has a configuration in which surges would not cause optical parts to be degraded, and compensation for changes in the loss and loss differential among the channels is implemented even while the optical switching apparatus is in service.

Therefore, in one aspect, the present invention relates to an optical switching apparatus. The optical switching apparatus includes an optical switching unit with a plurality of input ports and a plurality output ports, a plurality of input signal adjusting units, and a plurality of output signal monitoring units. The optical switching apparatus further includes a controlling unit connected to the input signal adjusting units, the optical switching unit and the output signal monitoring units. The controlling units select at least one of the input signal adjusting units and at least one of the output signal monitoring units based on the configuration of the optical switching unit and control the amplitude of the optical signals by controlling the selected one input signal adjusting unit based on the feedback from the selected one output signal monitoring unit.

In a preferred embodiment, the present invention relates to an optical switching apparatus including an optical switch with a plurality of input ports and a plurality of output ports, a plurality of optical amplifiers, a plurality of monitor circuits and a controller that supervises and controls the optical switch, the optical amplifiers and the monitor circuits. The optical amplifiers are connected to the respective input ports of the optical switch, and the monitor circuits are connected to the respective output ports of the optical switch. The controller selects one of the monitor circuits according to prescribed rules and obtains the optical power and the differential loss between channels at the output port. The controller selects and controls at least one optical amplifier to according to the setup state of the optical switch. The selected amplifier amplifies the optical signal to be inputted to the input port of the optical switch, and the compensation for the loss and differential loss between channels of the optical switch is made for each input/output port pair of the optical switch. In other words, a pair of an optical amplifier on the input port side of the optical switch and an monitor circuit on the output port side of the optical switch is selected to compensate for the loss and the differential loss between channels of the optical switch for each of its input/output port pair.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

The optical switching apparatus of the present invention and methods for using this apparatus will be described in detail using the drawings.

Figure 1:
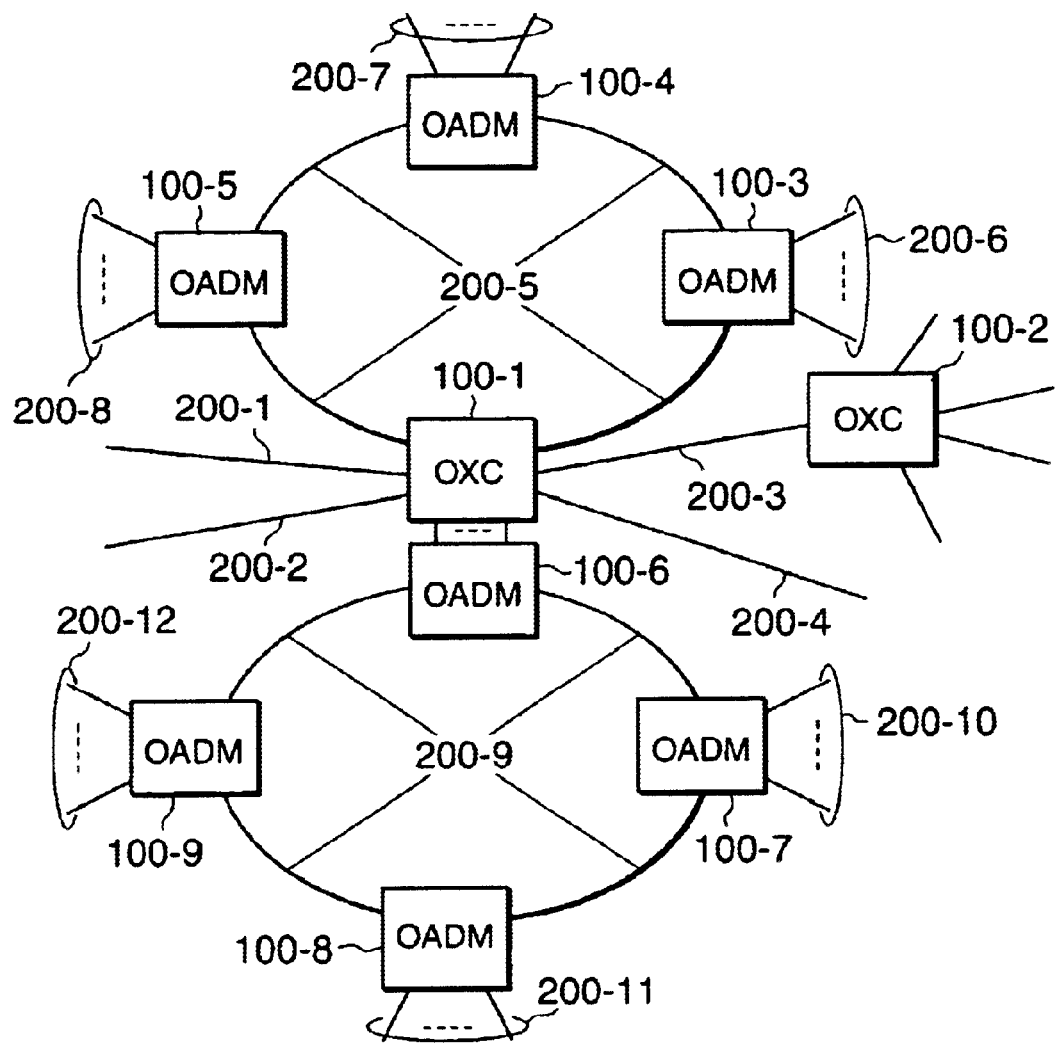
FIG. 1 is a schematic diagram illustrating an example of configuration of a communication network equipped with one preferred embodiment of the optical switching apparatus according to the present invention.

FIG. 1 is a schematic diagram of a network, which illustrates an example of configuration of a communication network wherein the optical switching apparatuses of the present invention are used. The optical switching apparatuses or the OADM'S 100-1~100-9 are interconnected with optical fibers 200-1~200-12 to form a communication network. Specific types of the optical switching apparatuses include optical cross-connects or OXC, 100-1, 100-2, which switch, multiplex and output the multiplexed optical signals received from each of the input optical fibers, 200-1~200-5 to the output optical fibers. Other switching apparatuses include the optical add-drop multiplexing apparatuses, OADM 100-3~100-9, which separate or insert the optical signals needed for the OADMs connected to the other OADMs from the multiplexed optical signals received from the optical fibers 200-5 and 200-9. The OADM'S 100-

3~100-9 transmit the optical signals through the optical fibers 200-6~200-12 among the OADMs. The communication network is formed by connecting these optical switching apparatuses of the present invention with the optical fibers that transmit the optical signals having an appropriately multiplexed level and transmission speed that are required of the communication network.

Furthermore, the optical switching apparatuses of the present invention easily build a communication network in a flexible configuration that handles various transmission speeds and levels of multiplexed optical signals by appropriately selecting the components in the optical switching apparatus. For instance, the optical signal has a speed at or above STM-0 (51.84 MHz) as specified by the ITU-T recommendation, or the optical signal is an un-modulated direct current light. In addition, there is no limitation to the presence or absence of wavelength-division-multiplexers or the number of wavelength-division-multiplexers either. For instance, to handle 16 wavelength-division-multiplexers signal counts and 4 switching directions, an OXC with a switching scale of around 64×64 will be needed. In this case, it would be difficult to realize a compact signal switching apparatus with electronic circuits when the transmission speed is 2.5 G bits per second, 10 G bits per second or faster. However, the optical switching apparatus of the present invention easily handles the above tasks.

Figure 2:
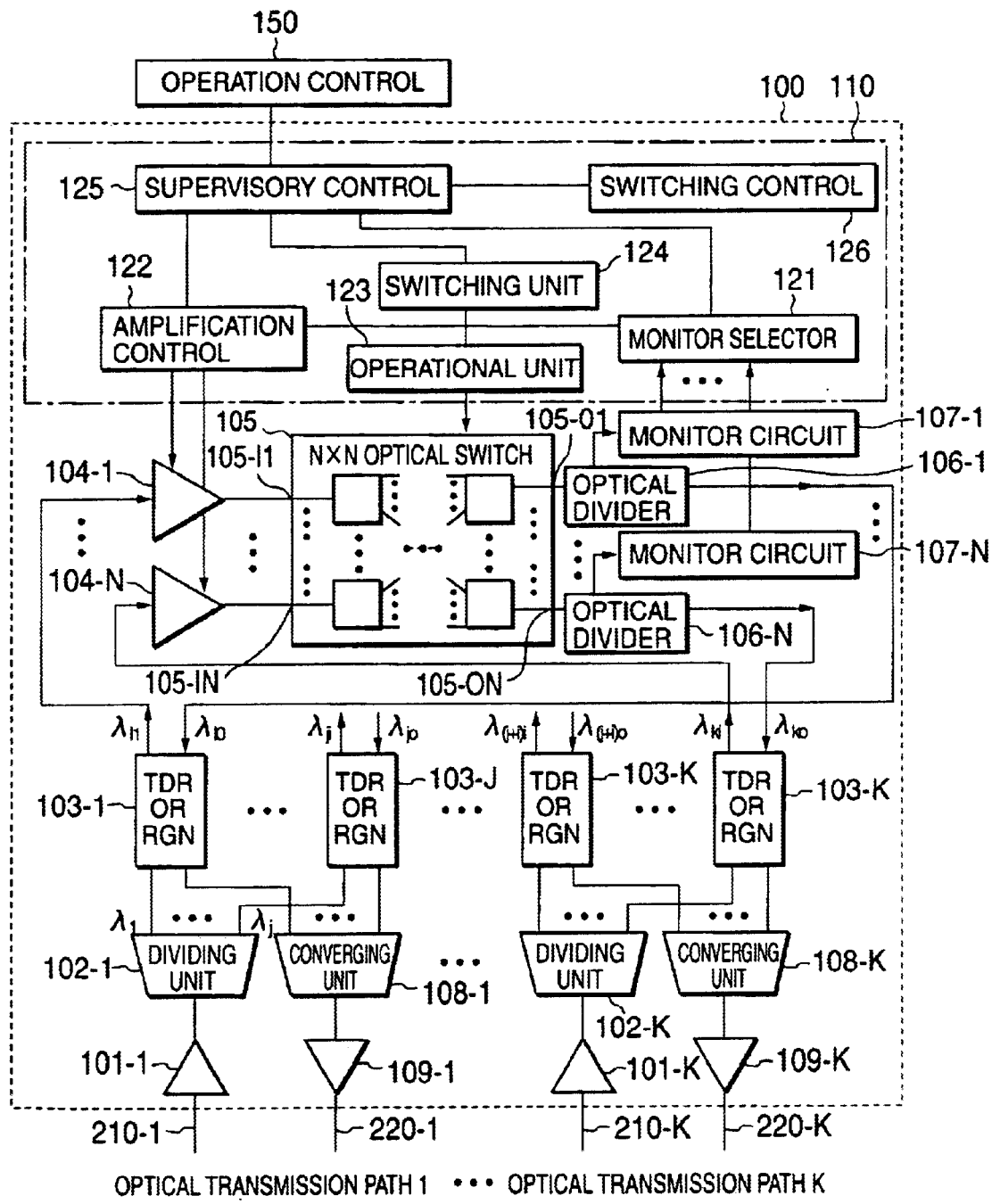
FIG. 2 is a schematic block diagram, which illustrates an example of configuration of an optical switching apparatus of the present invention.

FIG. 2 is a schematic block diagram, which illustrates an embodiment of the structure of the optical switching apparatus according to the present invention. The optical switching apparatus 100 in this embodiment includes K pieces of optical fibers 210-1~210-K, and 220-1~220-K for respectively inputting and outputting optical signals. The optical switching apparatus 100 offers the OXC function. After receiving a plurality of wavelength multiplexed optical signals (for instance, j wavelength) from a particular one of the optical fibers 210-1~210-K, N×N optical switch 105 switches them toward the destinations of the optical signals. The optical signals are compensated for the loss and the differential loss among the channels due to the particular one of the optical fibers 220-1~220-K to which the optical signals are switched by N×N optical switch 105.

Specifically, the optical signals received from the particular one of the optical fibers 210-1~210-K through a particular one of the optical input circuits 101-1~102-K that is the realized by means of optical amplifiers, etc. are wavelength-demultiplexed by a particular one of wavelength demultiplexers 102-1~102-K for each wavelength. The optical signal of each wavelength has its wavelength converted or regenerated by a particular one of the transponders or regenerators 103-1~103-K (TDR or RGN), which is then fed to a particular one of the optical amplifiers 104-1~104-N of the optical switching apparatus of the present invention.

After passing through a particular input ports 105-I1~105-IN of N×N optical switches 105, the optical signal, with its amplitude being controlled by a particular optical amplifiers 104-1~104-N depending on the particular input circuit, is switched and transferred to one of the output ports 105-O1~105-ON of the optical switches 105 depending on the destination of the optical signal. The optical signal switched by the optical switches 105 passes through optical splitters or optical couplers 106-1~106-N. The optical signal of each wavelength is then converted or regenerated by transponders or regenerators 103-1~103-K (TDR or RGN) in the same manner as the optical signal being converted or regenerated before reaching the particular input ports 105I1~105IN of the optical switch 105. Optical signals with different wavelengths are then appropriately wavelength-division-multiplexed by the wavelength multiplexers 108-1~108-K, and are then outputted to the optical fibers 220-1~220-K through the output circuits 109-1~109-K that are realized by optical amplifiers, etc. in the same manner as the input circuits.

Monitor circuits 107-1~107-N monitor the state of the optical signals such as the optical signal amplitude and the differential loss between the channels at each output port of the optical switch 105. A controller 110 includes a monitor selector 121, for selecting one of the monitor circuits 107-1~107-N, an amplifier controller 122 that controls each of the optical amplifiers 104-1~104-N, which compensate optical signals before their reaching the input ports 105I1~I05IN according to the state of the outputted optical signal, an optical switch driver or operational unit 123, a switch control unit 124, which sets up the optical transfer paths from the input ports 105-I1~105IN to the output port 105-O1~105-ON of the optical switch 105 and a supervisory control unit 125, which supervises and controls the optical switching apparatus 100 by interlocking with the monitor selector 121, amplifier controller 122, and switch control unit 124. Furthermore, the controller 110 further includes a switch management unit 126 for managing and storing the switch configuration information needed to set up the optical switch, the information on the actually set-up paths within the switch, etc. This controller 110 further communicates with the operation management unit 150 regarding the monitoring or controlling of the optical switching apparatus 100 of the present invention, sets up the optical switch 105, and compensates for the loss and differential loss among the channels of the optical switch by controlling the monitor circuit 107-1~107-N and the optical amplifier 104-1~104-N.

Figure 3:
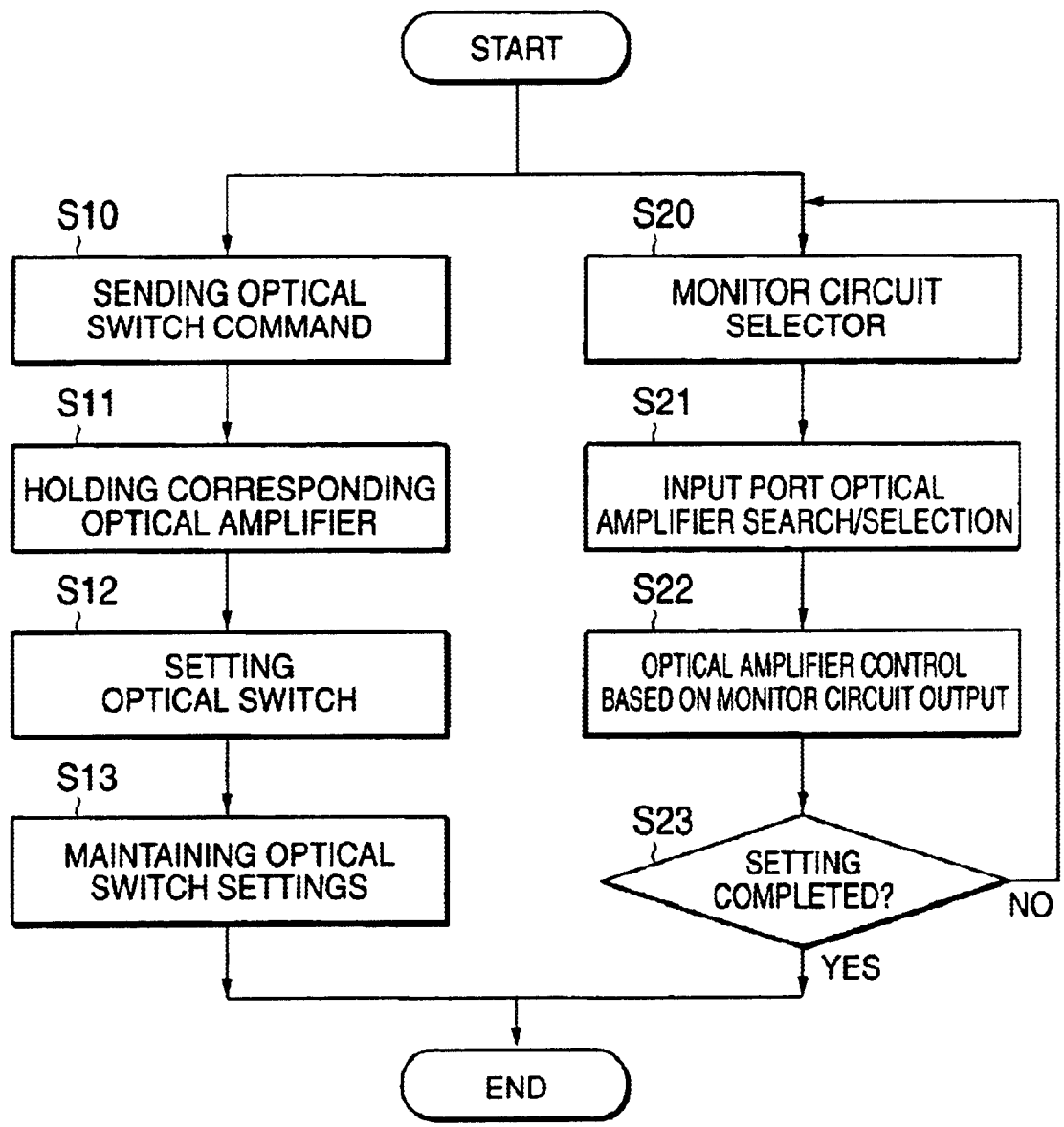
FIG. 3 is an operational flow chart, which illustrates an example of operation of the controller.

FIG. 3 is an operational flow chart, which describes the operation of the controller 110 of the optical switching apparatus 100 of the present invention. Using FIGS. 2 and 3, the setup in the optical switching apparatus according to the present invention and the operation for compensating for the loss and the differential loss between the channels of the optical signal will be described in detail.

(1) Setup in Optical Switch

When an optical switch 105 setup or "switching" command is received in step S10 from the operation management unit 150, the optical amplifiers 104-1~104-N related to the applicable input port is put on hold in step S11, the path from the input port to the output port of the optical switch 105 is set up or switched in step S12. The connection set-up information is held in the switch management unit 126 or equivalence thereof. Furthermore, the purpose of putting the optical amplifiers 104-1~104-N on hold in step S11 is to avoid the unstable operation of the optical amplifiers 104-1~104-N while the monitor circuit 107-1~107-N are switched. The same effect is also obtained by setting the response speed of the optical amplifiers 104-1~104-N at a slower speed than the switching speed of the monitor circuit.

(2) Compensation for Optical Signal

When one of the monitor circuits 107-1~107-N is selected in step S20 according to the predetermined rules (cycles, supervisory orders, etc.), the supervisory control unit 125 searches and selects one of the optical amplifiers 104-1~104-N connected to the input port corresponding to the output port that corresponds to this selected monitor circuits 107-1~107-N from the pre-held connection set-up information in step S21.

The feedback from the selected one of the monitor circuits 107-1~107-N is inputted from the monitor selector 121 to the amplifier controller 122. The amplifier controller 122 controls the selected one of the optical amplifiers 104-

1~104-N by assigning the received feedback from the monitor circuit to the selected one of the optical amplifiers 104-1~104-N during the selection step S21 using internal switches (not illustrated) in the amplifier controller 122 thereby to compensate for the loss and the differential loss between the channels of the optical signal at the optical switch output ports.

This compensation operation comprising the steps S20, S21 and S22 is repeated until all the proper optical paths are set up in the optical switch 105. Step S23 checks if all the optical paths have been set up.

The optical switch 105 used in the optical switching apparatus 100 of the present invention is preferably an N×N high-capacity switch, which may be produced by combining multi-stage commercially available low capacity switches such as 2×2, 8×8, 16×16 switches. For instance, the SiO2 waveguide-based optical switch is disclosed in the OFC 2000 (Optical Fiber Communication Conference) TuM2-1/207 (March 2000, p. p. 207); the MEMS (Micro Electro Mechanical Systems) optical switch is disclosed in the OECC '98 (Third Opt electronics and Communications Conference) 15D1-8 (July 1998, p. p. 400), the inkjet bubble technology-based optical switch is disclosed in the OFC 2000 TuM1-1/204 (March 2000, p. p. 204); and the mechanical optical switch is disclosed in the 1997 Denshi Joho Tsushin Gakkai [Electronic Information and Communication Association/Tsushin [Communication] Society Conference/B-10-189. The above switches are appropriately used as the low-capacity switch to form the N×N high-capacity switch used in the optical switching apparatus according to the present invention. Of course, if a single stage high-capacity optical switch becomes commercially available in the future, such a single stage high-capacity optical switch may be used as the optical switch 105 used in the present invention.

Furthermore, the optical switching apparatus 100 of the present invention does not require special components for the optical amplifiers 104-1~104-N, and optical splitters or optical couplers 106-1~106-N. Commercialized standard parts are in the optical amplifiers 104-1~104-N and optical splitters or optical couplers 106-1~106-N. Also, depending on the level of loss compensation required for the optical switch 105 or the performance of its peripheral equipments, devices such as variable optical attenuators, that control the characteristics of optical signals, are optionally used in place of the optical amplifiers 104-1~104-N.

Through its optical amplifiers 104-1~104-N, the optical switching apparatus 100 of the present invention properly compensates the loss and differential loss in optical signals after they pass through different channels in the optical switch 105 by monitoring the output ports of the optical switch 105, in a high capacity optical switch. In addition, the compensation to the loss and differential loss of the optical signals is made while the controller is in the process of selecting the monitor circuit. Furthermore, an optical switching apparatus containing a high capacity optical switch properly compensates for the loss and the differential loss between the channels of the optical signal even while it is in service. The optical switching apparatus of the present invention requires only a simple configuration and procedure.

More preferably, the optical switch apparatus 100 of the present invention further optionally includes receiving circuits 101~101-K, wavelength demultiplexers 102-1~102-K, transponders or regenerators 103-1~103-K, wavelength multiplexers 108-1 108-K and transmitting circuits 109-1~109-K depending on the condition such as the speed or the level of multiplexing of optical reception, which is transmitted and received through optical fiber, under which the optical switching apparatus 100 of the present invention is used. In an alternative embodiment of the optical switching apparatus of the present invention, the optical fibers 210-1~210-K, 220-1~220-K are directly connected to the optical amplifiers 104-1~104-N and the optical splitters or optical couplers 106-1~106-N.

The aforementioned configuration in FIG. 2 is an embodiment of an OXC, which is one type of the optical switching apparatus according to the present invention. In an OADM, which is another type of the optical switch apparatus, a partially separated or inserted optical signal in the OADM, is directly inputted from the optical amplifiers 104-1~104-N and outputted to the optical splitters or optical couplers 106-1~106-N, or is inputted to and outputted from the TDRs or the RGNs 103-1~103-K.

Since the loss compensation for the optical switch 105 is respectively made by the optical amplifiers and the monitor circuits on the input and output sides of the optical switch, the loss compensation is not influenced by the peripheral optical fibers or the optical signals. Therefore, the optical switching apparatus of the present invention has few restrictions on the wavelengths of the optical signals and the multiplexing methods.

Figure 4:
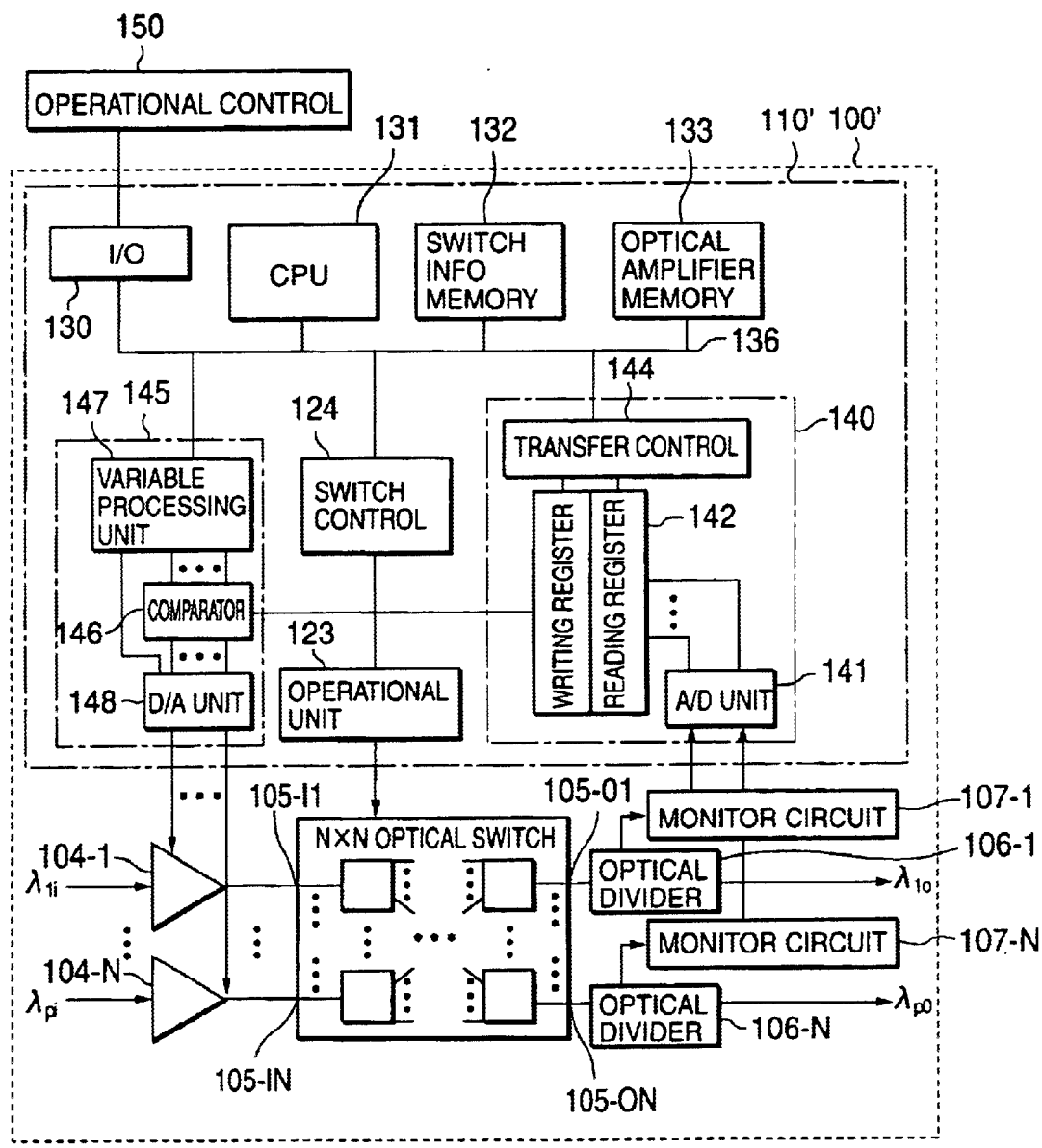
FIG. 4 is a schematic block diagram, which illustrates another example of configuration of an optical switching apparatus of the present invention.

FIG. 4 illustrates another embodiment of an optical switching apparatus of the present invention. In the optical switching apparatus 100' of FIG. 4, the input circuits and output circuits of the OXC illustrated in FIG. 2 are simplified, and the configuration of the controller 110 is replaced by another controller 110', which implements the control with firmware or software. Hereafter, the configuration of the controller 110', which is different from the controller 110 in FIG. 2, and the operation of controller 110' will be explained. In FIG. 4, the components that are substantially identical to those in FIG. 2 are labeled with the same number.

The controller 110' includes an IO unit 130 and an operation management unit 150. The IO unit 130 is connected to and communicates with the operation management unit 150. The controller 110' further includes a CPU 131 which controls the controller 110', a monitor selector 140, an amplifier controller 145, and a switch control unit 124 for an optical switch 105 through a bus 136. Switch information memory 132, which is an internal memory, stores the connection set-up information for the optical switch 105. An optical amplifier memory 133 stores the control target value or the alarm information. Based on a firmware or software stored in a CPU memory (not illustrated), CPU 131 controls each of the aforementioned units. Optionally, the switch information memory 132, the optical amplifier memory 133 and the CPU memory reside on a single memory chip.

The monitor selector 140 includes analog-to-digital converters 141 that convert a feedback signal from each one of the monitor circuits 107-1~107-N into digital data. The monitor selector 140 further includes a data storage device including a writing register 142 and a reading register 143 that hold the digital data. The monitor selector 140 further includes a transfer control unit 144 that controls the writing register 142 and the reading register 143. Optionally, the transfer control unit 144, the writing register 142 and the reading register 143 reside in the CPU 131 and/or the memory chip(s).

The amplifier controller 145 includes a comparator 146 that compares the digital data, which is the feedback from each one of the monitor circuit 107-1~107-N with control target values in the optical amplifier memory 133. A parameter-processing unit 147 selects a particular one of the optical amplifiers 104-1~104-N to be controlled based on the above comparison result and generates control data. A digital-to-analog converter 148 converts the control into analog signals to control the particular one of the optical amplifiers 104-1~104-N. Optionally, the comparator 146, the optical amplifier memory 133 and the parameter-processing unit 147 reside in the CPU 131 and/or the memory chip(s). Optionally, CPU 131 performs all of the processing steps of the amplifier controller 145 except for the step of the A/D conversion.

Figure 5:
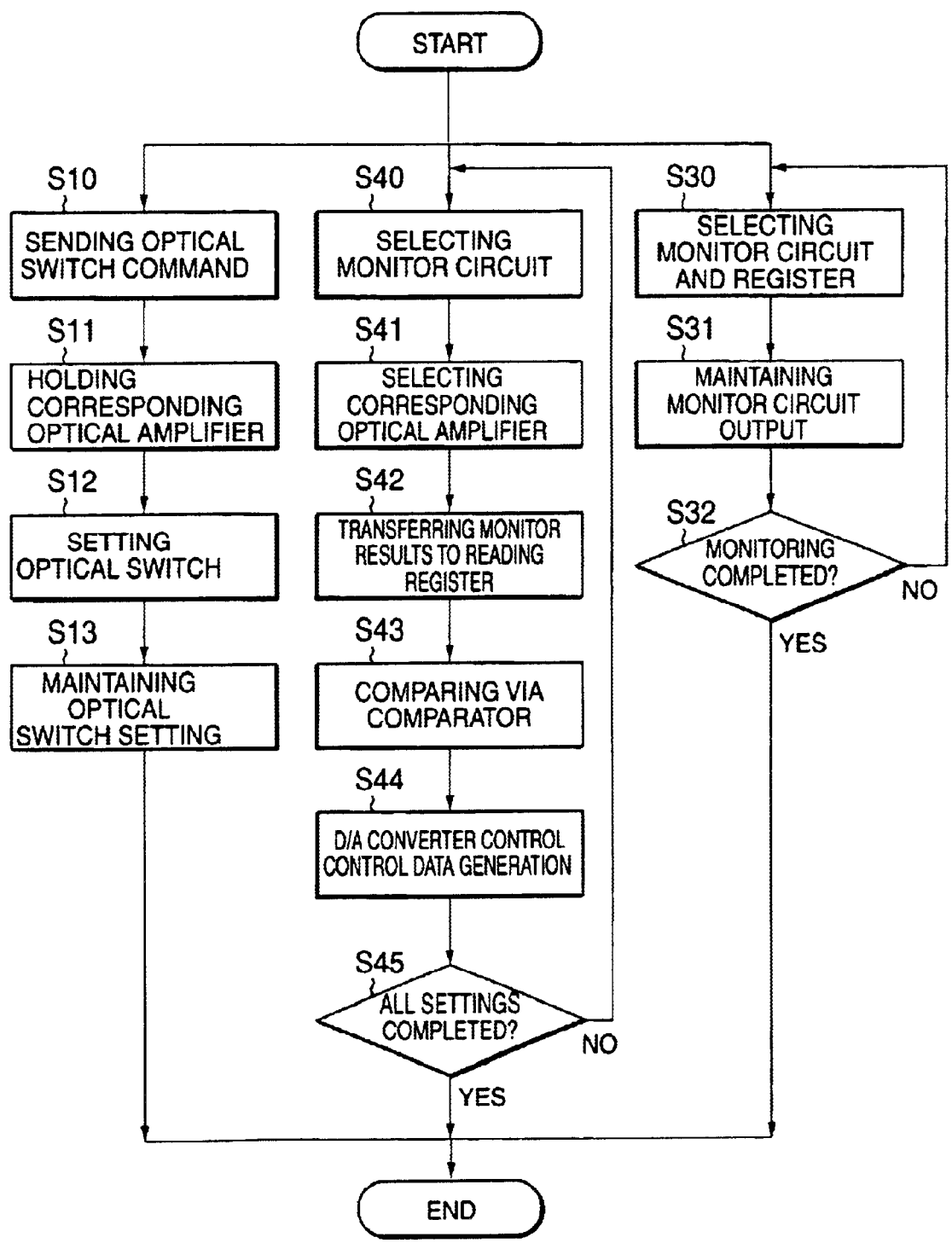
FIG. 5 is an operational flow chart, which illustrates another example of operation of the controller.

FIG. 5 is an operational flow chart that describes the operation of the controller 110' in the apparatus of FIG. 4.

The controller (110') in the aforementioned configuration operates as follows to compensate for optical signals. (1) Set-up of optical switch: Same as the steps S10 through S13 in FIG. 3. Holding the connection set-up information in the switch information memory 132 in the Step S13.

(2) Compensation for Optical Signal a) The CPU 131 notifies the transfer control unit 144 for the particular one of the monitor circuits 107-1~107-N to be monitored and select a particular area of the write register 142 to store the feedback signal from the monitor circuits 107-1~107-N in Step S30. The transfer control unit 144 stores the digital data, that is the feedback signal from the selected one of the monitor circuits 107-1~107-N and has been converted into digital data by the analog-to-digital converter 141 in the particular area of the write register 144 in Step S31. The CPU 131 repeats the steps S30 and S31 until all the paths have been set up in the optical switch 105 using the predetermined rules such as cycles, supervisory orders, etc. and the connection information stored in the switch information memory 132 Step S32.

b) Meanwhile, when one of the monitor circuits 107-1~107-N is selected in Step S40 according to the predetermined rules such as cycles, supervisory orders, etc., the CPU 131 searches and selects a particular one of the optical amplifiers 104-1~104-N that is connected to a particular input port based on the selected monitor circuit and the connection set-up information in the switch information memory 132 in Step S41.

Through the transfer control unit 144, the digital data, that is the feedback signal from the selected monitor circuit is transferred from the write register 142 to the readout register 143, and finally to the comparator 146 in Step S42.

The comparator compares the digital data received in Step S42 and the control target value obtained from the optical amplifier memory 133 and generates a result in Step S43. The parameter-processing unit 147 prepares the parameters based on the comparison result in Step 543 to control the particularly selected one of the optical amplifiers 104-1~104-N, and it controls the selected one of the optical amplifiers 104-1~104-N through the digital-to-analog converter 148 in Step S44 to compensate for the loss and the differential loss among the different channels of the optical signals at the optical switch output port.

The above compensation steps S40~S44 are repeated until all the optical paths in the optical switch 105 have been set up Step S45. Through its optical amplifiers 104-1~104-N, the optical switching apparatus 100' of the present invention properly compensates the loss and differential loss in optical signals after they pass through different channels in the optical switch 105 by monitoring the output ports of the optical switch 105. In addition, a high-speed and high-capacity optical switching apparatus with a simple configuration and the procedure and method of using this apparatus are describe as follows: Since the CPU 131 selects one of the monitor circuits 107-1~107-N based on the content of the firmware or the software, the loss and the differential loss among the channels of the optical signals is easily and securely compensated even while the apparatus 100' is in service. Furthermore, when the optical connection configuration of the apparatus is changed, such a change is easily incorporated by modifying the firmware or the software in the optical switching apparatus 100'.

Figure 6:
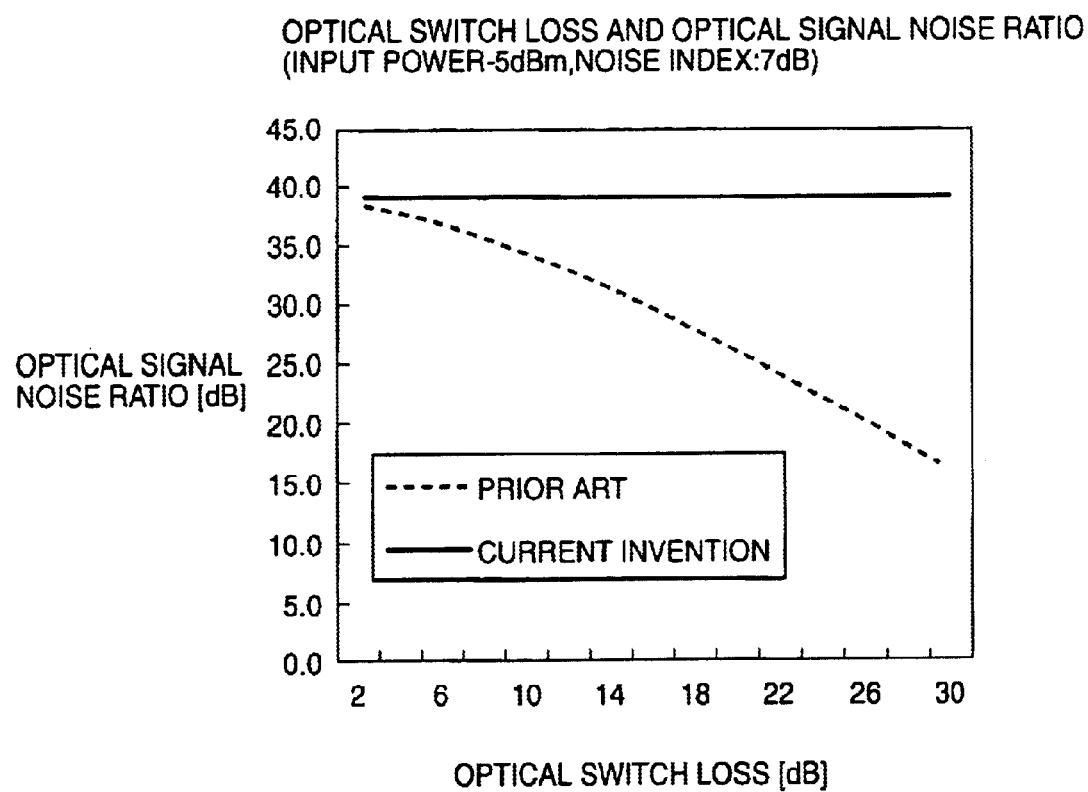
FIG. 6 is an explanatory diagram, which illustrates an example of improvement of optical signals by means of an optical switching apparatus of the present invention.

FIG. 6 is an explanatory diagram that illustrates an example of the improvement of optical signals made by the optical switching apparatus of the present invention. When the optical switching apparatus 100 or 100' of the present invention is implemented in a communication network, the actual loss or differential loss among the channels of the optical switch is monitored on the output side of the optical switch. The monitored result is fed back to the optical amplifier at the input side of the optical switch, and the optical switch is operated with the pre-compensated optical signal. Therefore, the loss that actually occurred at the connection set-up or the switching of the optical switch is compensated, and an optical signal-to-noise ratio is kept constant independent of the loss.

According to the optical switching apparatus of the present invention and method for use thereof, even if a high capacity optical switch is used in the optical switching apparatus, the loss and the differential loss among the channels of the optical signal through the optical switch is monitored on the output port side of the optical switch. Therefore, the optical signal is properly compensated with a simple configuration and procedure using the optical amplifier on the input port side of the optical switch based on the monitored feedback signal.

What is claimed:

1. A method of switching optical signals from a plurality of input circuits to one of a plurality of output circuits using an optical switching apparatus that includes an optical switch having a plurality of input ports and output ports, optical amplifiers for amplifying the optical signals received by the input circuits, and monitor circuits for monitoring the optical signals outputted to the output circuits, comprising the steps of:

selecting a particular one of the plurality of monitor circuits;

monitoring the optical signals at the output port connected to the selected monitor circuit to generate a feedback signal;

selecting a particular one of the plurality of the optical amplifiers based on a predetermined configuration of the optical switch; and amplifying the optical signals by the selected optical amplifier based on the feedback signal.

2. A method of switching optical signals from a plurality of input circuits to one of a plurality of output circuits using an optical switching apparatus that includes an optical switching unit having a plurality of input ports and output ports, input signal adjusting units for adjusting state of optical signals received by the input circuits, and output signal monitoring units for monitoring the state of the optical signals outputted to the output circuits, comprising the steps of:

selecting a particular one of the output signal monitoring units;

monitoring the optical signals at the output port connected to the selected output signal monitoring unit to generate a feedback signal;

selecting a particular one of the input signal adjusting units based on a predetermined configuration of the optical switching unit; and amplifying the optical signals by the selected input signal adjusting unit based on the feedback signal.

3. The method as claimed in claim 2, wherein the output signal monitoring units monitor an amplitude of the optical signals outputted from the optical switching unit to generate the feedback signals.

4. The method as claimed in claim 2, wherein the output signal monitoring units monitor a differential loss among different channels outputted from the optical switching unit to generate the feedback signals.

5. A method of switching optical signals from a plurality of input circuits to one of a plurality of output circuits, comprising the steps of:

selecting a particular one of the output signal monitoring units;

monitoring the optical signals at an output port connected to the selected output signal monitoring unit to generate a feedback signal;

selecting a particular one of the input signal adjusting units based on a predetermined configuration of an optical switching unit; and amplifying the optical signals by the selected input signal adjusting unit based on the feedback signal.

6. The method as claimed in claim 5, wherein the output signal monitoring units monitor an amplitude of the optical signals outputted from the optical switching unit to generate the feedback signals.

7. The method as claimed in claim 5, wherein the output signal monitoring units monitor differential loss among different channels outputted from the optical switching unit to generate the feedback signals.

8. An optical switch for switching optical signals from a plurality of input circuits to one of a plurality of output circuits, comprising;

an optical switching unit;

input ports connected to said optical switching unit for inputting the optical signals to said optical switching unit;

output ports connected to said optical switching unit for outputting the optical signals from said optical switching unit;

optical amplifiers connected to said input ports for amplifying the optical signals received by the input circuits;

monitor circuits located at said output ports for monitoring the optical signals outputted to the output circuits;

a monitor selector connected to said monitor circuits for selecting one of said monitor circuits, the selected monitor circuit being operationally connected to one of said output ports for generating a feedback signal; and an amplification control connected to said monitor selector and said optical amplifiers for selecting one of said optical amplifiers based on a predetermined configuration of the optical switch, wherein said selected optical amplifier amplifies the optical signals based on the feedback signal.

9. An optical switch for switching optical signals from a plurality of input circuits to one of a plurality of output circuits, comprising;

an optical switching unit;

input ports connected to said optical switching unit for inputting the optical signals to said optical switching unit;

output ports connected to said optical switching unit for outputting the optical signals from said optical switching unit;

input signal adjusting units connected to said input ports for adjusting state of the optical signals received by the input circuits;

monitor circuits located at said output ports for monitoring the optical signals outputted to the output circuits;

a monitor selector connected to said monitor circuits for selecting one of said monitor circuits, the selected monitor circuit being operationally connected to one of said output ports for generating a feedback signal; and a control connected to said monitor selector and said input signal adjusting units for selecting one of said input signal adjusting units based on a predetermined configuration of the optical switch, wherein said selected input signal adjusting unit adjusts the optical signals based on the feedback signal.

10. The optical switch as claimed in claim 9, wherein said output signal monitoring units monitor an amplitude of the optical signals outputted from the optical switching unit to generate the feedback signals.

11. The optical switch as claimed in claim 9, wherein said output signal monitoring units monitor a differential loss among different channels outputted from the optical switching unit to generate the feedback signals.

12. An optical switch for switching optical signals from a plurality of input circuits to one of a plurality of output circuits, comprising;

an optical switching unit having an output port and an input port;

input signal adjusting units connected to said input ports for adjusting state of the optical signals received by the input circuits; and monitor circuits located at said output ports for monitoring the optical signals outputted to the output circuits and for generating a feedback signal, wherein said selected input signal adjusting unit adjusts the optical signals based on the feedback signal.

13. The optical switch as claimed in claim 12, wherein said monitor circuits monitor an amplitude of the optical signals outputted from said optical switching unit to generate the feedback signals.

14. The optical switch as claimed in claim 12, wherein said monitor circuits monitor differential loss among different channels outputted from said optical switching unit to generate the feedback signals.

* * * * *